United States Patent
Latteo

(10) Patent No.: US 10,077,888 B2
(45) Date of Patent: Sep. 18, 2018

(54) PROJECTOR OF LIGHT BEAMS WITH ADJUSTABLE OPTICAL BODIES

(71) Applicant: D.T.S. ILLUMINAZIONE S.r.l., Misano Adriatico, Rimini (IT)

(72) Inventor: Eliseo Latteo, Rimini (IT)

(73) Assignee: D.T.S. ILLUMINAZIONE S.R.L., Misano Adriatico (IT)

( * ) Notice: Subject to any disclaimer, the term of this patent is extended or adjusted under 35 U.S.C. 154(b) by 250 days.

(21) Appl. No.: 15/017,768

(22) Filed: Feb. 8, 2016

(65) Prior Publication Data

US 2016/0238217 A1 Aug. 18, 2016

(30) Foreign Application Priority Data

Feb. 16, 2015 (IT) ................ BO2015A0073

(51) Int. Cl.
*G03B 21/14* (2006.01)
*F21V 14/06* (2006.01)
(Continued)

(52) U.S. Cl.
CPC .............. *F21V 14/06* (2013.01); *F21S 10/00* (2013.01); *F21S 10/026* (2013.01); *F21V 5/02* (2013.01);
(Continued)

(58) Field of Classification Search
CPC .......... F21V 5/008; F21V 17/02; F21V 13/12; F21V 14/06; F21V 14/065; F21V 14/08;
(Continued)

(56) References Cited

U.S. PATENT DOCUMENTS

2001/0055209 A1* 12/2001 Dedoro ................. F21S 10/007
362/293
2002/0060911 A1 5/2002 Brockmann et al.
(Continued)

FOREIGN PATENT DOCUMENTS

EP 1 384 941 A2 1/2004
EP 1 944 330 A2 11/2008
(Continued)

OTHER PUBLICATIONS

Search Report for corresponding Italian Patent Application No. BO20150073 dated Aug. 31, 2015.

*Primary Examiner* — Karabi Guharay
*Assistant Examiner* — Steven Horikoshi
(74) *Attorney, Agent, or Firm* — Renner Otto Boisselle & Sklar LLP

(57) ABSTRACT

A light beam projector includes a shell; a light source; an outlet lens; a first optical body for focusing a light beam from the light source, interposed between the light source and the outlet lens; a second optical body for varying the focal length of the light beam, interposed between the first optical body and the outlet lens; a third optical body generating an optical effect on the light beam; the third optical body including a lens movable between a non-operating position and an operating position, wherein the third optical body is positioned along the light beam trajectory; a carriage for supporting the third optical body; and a movement device connected to the carriage for moving the third optical body along a trajectory parallel to the shell so as to modify its position relative to the first and second optical bodies.

10 Claims, 9 Drawing Sheets

(51) Int. Cl.
  *F21S 10/02* (2006.01)
  *F21S 10/00* (2006.01)
  *F21V 5/02* (2006.01)
  *F21V 5/04* (2006.01)
  *F21V 13/12* (2006.01)
  *F21V 17/02* (2006.01)
  *F21V 5/00* (2018.01)
  *F21W 131/406* (2006.01)

(52) U.S. Cl.
  CPC ............... *F21V 5/04* (2013.01); *F21V 5/048* (2013.01); *F21V 13/12* (2013.01); *F21V 17/02* (2013.01); *G03B 21/142* (2013.01); *F21V 5/008* (2013.01); *F21W 2131/406* (2013.01)

(58) Field of Classification Search
  CPC ....... F21V 14/085; F21S 10/00; F21S 10/026; G02B 7/023; G02B 7/14; G02B 7/16; G02B 7/24; G03B 21/142; G03B 21/145; G03B 21/20; G03B 21/2093
  See application file for complete search history.

(56) References Cited

U.S. PATENT DOCUMENTS

| | | | |
|---|---|---|---|
| 2009/0303723 A1* | 12/2009 | Cavenati | ............... F21V 5/008 362/268 |
| 2010/0246184 A1 | 9/2010 | Quadri et al. | |
| 2010/0321940 A1 | 12/2010 | Zhong | |
| 2013/0058094 A1 | 3/2013 | Jurik et al. | |

FOREIGN PATENT DOCUMENTS

| | | |
|---|---|---|
| WO | 2007/122459 A2 | 11/2007 |
| WO | 2013/142434 A2 | 9/2013 |

* cited by examiner

PROJECTOR OF LIGHT BEAMS WITH ADJUSTABLE OPTICAL BODIES

This application claims priority of Italian Patent Application No. BO2015A000073 filed Feb. 16, 2015, which is hereby incorporated herein by reference.

BACKGROUND OF THE INVENTION

This invention relates to a projector of light beams.

More specifically, the projector according to this invention is used for lighting television programs and outdoor or indoor public shows.

This type of the projector is structured to be able to emit a beam of light modified in amplitude, intensity, coloring and combined with optical effects capable of varying the shape of the beam emitted.

In order to be able to guarantee these features, the projector comprises a shell for containing and supporting the components which generate the light beam. The shell has a main longitudinal extension along a relative axis of longitudinal extension.

The shell is, normally, articulated to a support (usually configured in the form of a fork) to be able to rotate about at least a first axis transversal to the its longitudinal axis of extension, whilst the support is configured to be able to rotate about a second axis perpendicular to the axis of longitudinal extension to allow a series of coordinated positions designed to conveniently direct the light beam as a function of the lighting needs.

It should be noted that the components of the projector generating the light beam are positioned inside the shell and comprise, in the solutions currently known in the prior art, at least a light source positioned at a first end of the shell and connected to a source of energy for emitting the beam according to a direction of illumination parallel to the axis of longitudinal extension of the shell.

An outlet lens of the light beam is positioned at a second end of the containment shell and affects the passage of the light beam.

The projector also comprises a frame for connecting the two ends of the containment shell.

The frame supports a first optical body for focusing the light beam and interposed between the light source and the outlet lens; this first optical body is equipped with first means for movement along a wall of the frame for modifying its distance from the light source along a trajectory parallel to the longitudinal axis of the shell.

A second optical body for varying the focal length (or zoom) of the light beam is supported by the frame and interposed between the first optical body and the outlet lens. This second optical body comprises means for moving, in two directions, along the wall of the frame for modifying its position relative to the outlet lens (on one side) and the first optical body (on the other side) along a trajectory parallel to the longitudinal axis of the containment shell.

At least a third optical body defining, for example, but without limiting the scope of the invention, a prismatic lens generating an optical effect acting on the light beam (for example, splitting the light beam in several parts, or, depending on the position, variations of the outlet angle from the projector of luminous figures formed with the prismatic lens) and positioned inside the containment shell.

The third optical body, in one of the prior art solutions, is associated with, that is, articulated, to a supporting arm.

The supporting arm can rotate, selectively, between a non-operating position, wherein the third optical body is moved away from the first or second optical body and, therefore, from the light beam, and an operating position close to the first or second optical body wherein the third optical body is positioned along the trajectory of the light beam.

In a first prior art solution, the supporting arm of the third optical body is directly articulated to the frame of the projector in a stable position along the extension of the projector.

In two further prior art solutions the arm is articulated, to the first or to the second optical body.

In the first solution, the third optical body is positioned in such a way as to be interposed, in its operating configuration, always between the first and the second optical body.

In the second and third solution, the third optical body may be interposed, in its operating configuration, between the first and the second optical body or between the second optical body and the outlet lens of the light beam.

In these last two possibilities, the position of the third optical body is linked to the decision to connect the third optical body to the second optical body, upstream or downstream of the latter relative to the direction of the light source, or to the first optical body.

However, these three different solutions involve limitations or drawbacks to the operating capacity of the projector.

In the first solution mentioned above, in which the third optical body is fixed to the frame, the optical effect of the prismatic lens which can be obtained cannot be modified, that is, the outlet angle of the figure obtained is fixed and cannot be modified even by modifying the position of the first or second optical body.

In the second and third solution, that is, with direct connection between the first optical body or the second optical body with the third optical body, the latter again positioned at a fixed distance (center distance) relative to the optical body to which it is integral and again either downstream or upstream of them relative to the direction of emission of the light beam.

The fixed center distance between the third optical body and (again) one of the other two optical bodies does not allow modification/expansion of the effect which can be obtained from the prismatic lens which there would be adjusting the center distance or modifying the pre-eminence position (relative to the direction of emission of the light beam) between the three optical bodies.

SUMMARY OF THE INVENTION

The aim of this invention is to provide a projector of light beams which overcomes the above-mentioned drawbacks of the prior art.

More specifically, the aim of this invention is to provide a projector of light beams which is able to widen the range of optical effects of the projector in a safe and precise manner.

A further aim of this invention is to provide a projector of light beams which is able to expand its operational functionalities, while maintaining the reduced dimensions of the projector.

These aims are fully achieved by the projector of light beams according to this invention as characterized in the appended claims.

More specifically, the projector of light beams comprises a shell having a first end and a second end joined by a central frame to define an axis of extension of the shell.

The projector also comprises a light source located at the first end of the shell and connected to a source of energy for emitting a light beam along a lighting trajectory parallel to the axis of extension of the shell.

The projector also comprises an outlet lens of the light beam positioned at the second end of the shell.

The projector also comprises a first optical body for focusing the light beam, interposed between the light source and the outlet lens, and connected internally to the frame. The first optical body is configured to move, in both directions, along the frame in such a way as to modify its distance from the light source along a trajectory parallel to the axis of the shell.

Moreover, the projector comprises a second optical body for varying the focal length of the light beam, interposed between the first optical body and the outlet lens and connected internally to the frame. The second optical body is configured to move, in two directions, along the frame for modifying its position relative to the outlet lens and to the first optical body along a trajectory parallel to the axis of the shell.

The projector also comprises at least a third optical body that generates an optical effect acting on the beam of light and is positioned inside the frame. The third optical body has means for supporting a lens for optical effect configured to move, between a non-operating position, wherein the third optical body is moved away from the light beam, and an operating position, wherein the third optical body is positioned along the trajectory of illumination of the light beam.

According to the invention the projector comprises a carriage for supporting the third optical body connected to a wall of the frame.

Also according to the invention, the projector comprises movement means positioned on the frame and connected to the carriage for moving, in both directions, the at least third optical body along a trajectory parallel to the axis of the shell in such a way as to modify its position relative to the first and to the second optical body.

Thanks to these configurations, the third optical body is independent in the adjustment movements from the first and second optical body and may be positioned according to several operating positions both between the two optical bodies and before or after one of the same optical bodies: this makes it possible to increase the types of optical effects of the projector relative to the traditional prior art solutions, without affecting the overall dimensions and functional management of the projector.

BRIEF DESCRIPTION OF THE DRAWINGS

This and other features of the invention will become more apparent from the following detailed description of a preferred, non-limiting example embodiment of it, with reference to the accompanying drawings, in which.

DESCRIPTION OF THE PREFERRED EMBODIMENTS

Figure 1:
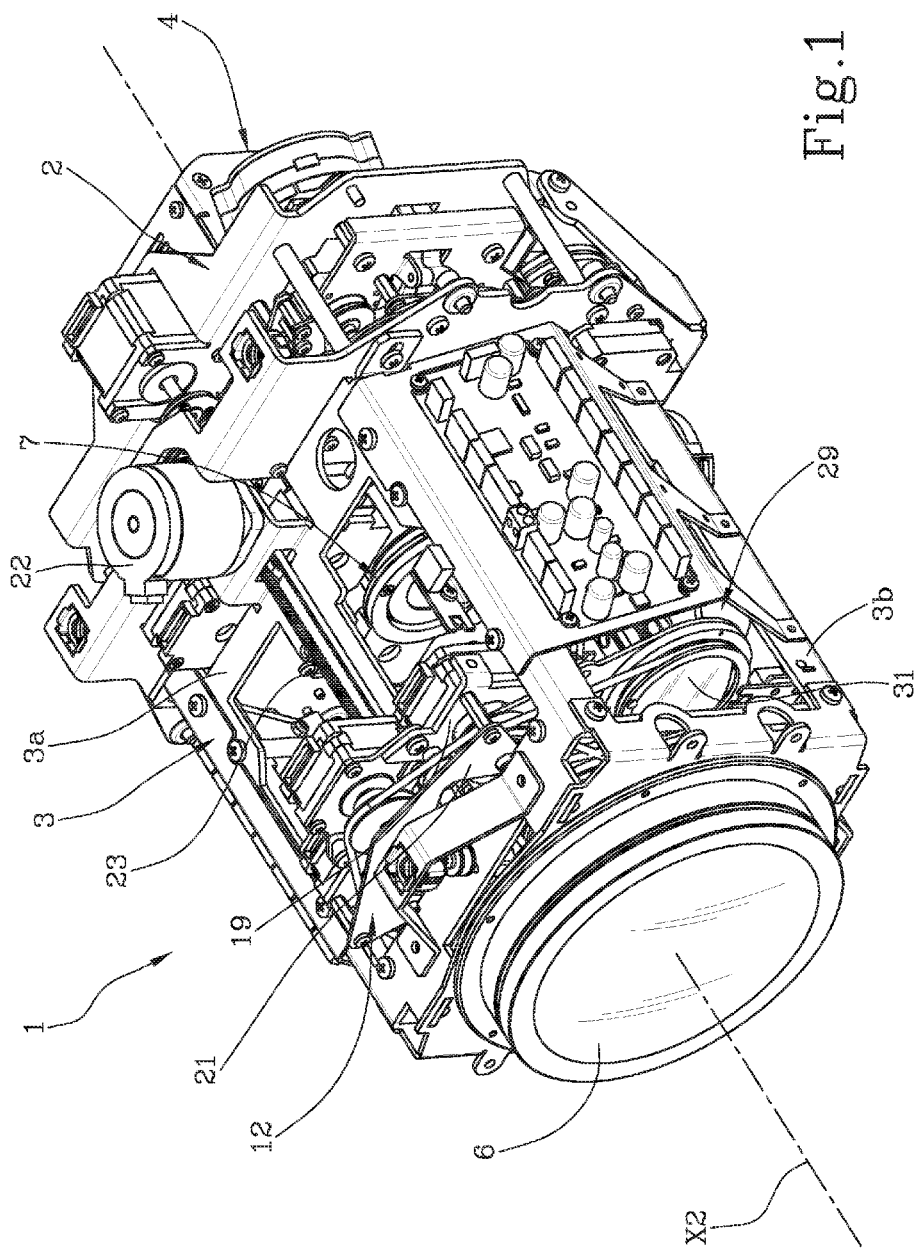
FIG. 1 is a perspective view of a projector for light beams according to this invention, with some parts cut away to better illustrate others.
Figure 2:
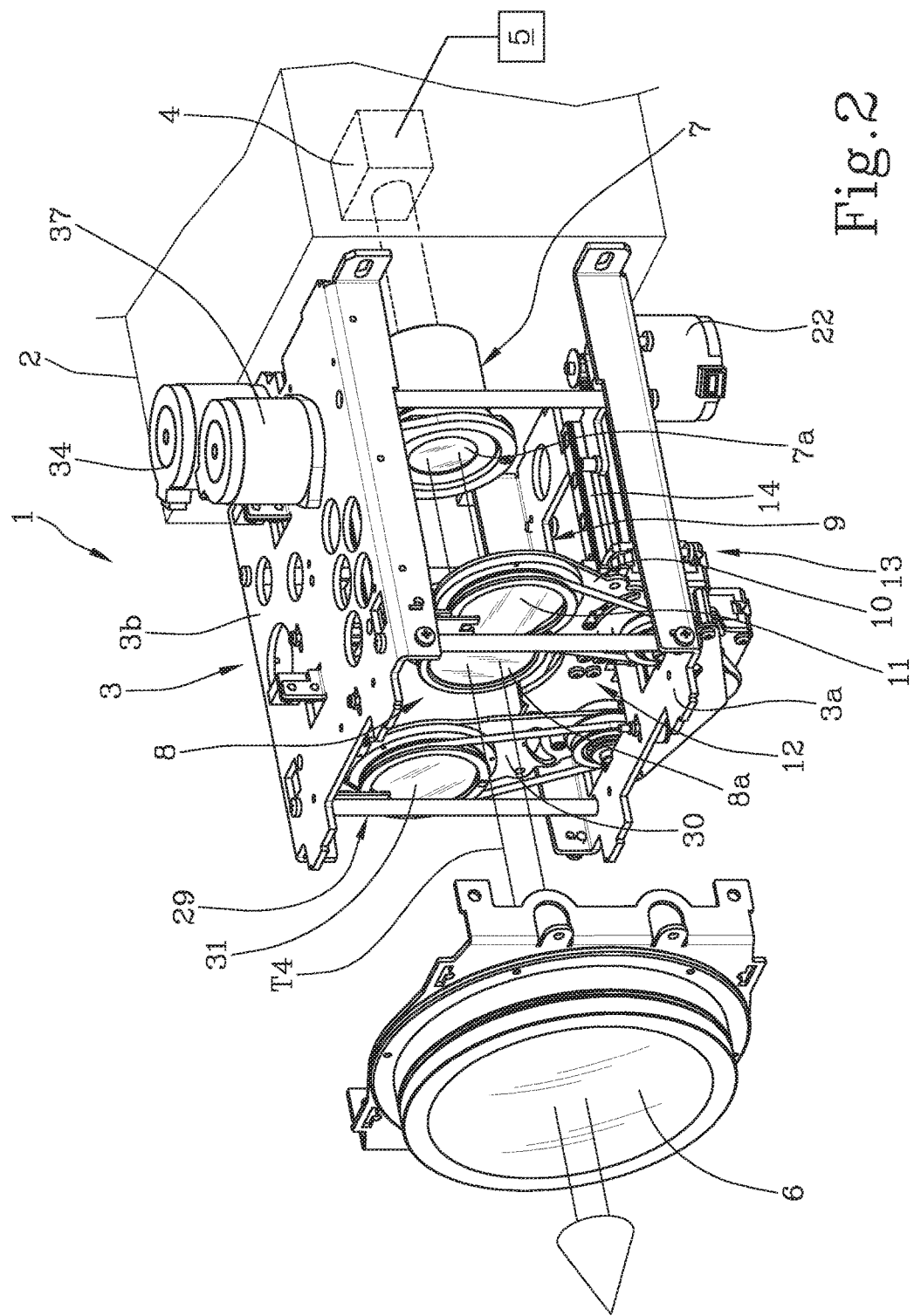
FIG. 2 is a perspective view of the projector of FIG. 1, rotated relative to the preceding drawing, with some parts exploded and others cut away to better illustrate some internal components.

With reference to the accompanying drawings, in particular with reference to FIGS. 1 and 2, the numeral 1 denotes a projector of light beams according to this invention.

More specifically, but without restricting the scope of the invention, the projector 1 according to this invention is used professionally for lighting television programs and outdoor or indoor public shows.

This type of the projector 1, in effect, is structured to be able to emit a beam of light modified in amplitude, intensity, coloring and combined with optical effects capable of varying the shape of the beam emitted.

The projector 1 of light beams comprises a shell 2 having a first end and a second end joined by a central frame 3 to define an axis X2 of extension of the shell 2 (in FIGS. 1 and 2 the shell 2 or covering is partly removed to better illustrate the internal parts of the projector 1).

The projector 1 comprises a light source 4 positioned at the first end of the shell 2 and connected to a source of energy 5 (illustrated schematically) for emitting a light beam according to a trajectory T4 of illumination parallel to the axis X2 of extension of the shell 2.

The projector 1 also comprises an outlet lens 6 of the light beam positioned at the second end of the shell 2.

The projector 1 also comprises a first optical body 7 for focusing the light beam, interposed between the light source 4 and the outlet lens 6, and connected internally to the frame 3.

In light of this, the first optical body 7 is configured to move, in both directions, along the frame 3 in such a way as to modify its distance from the light source 4 along a trajectory T7 parallel to the axis X2 of the shell.

Figure 3:
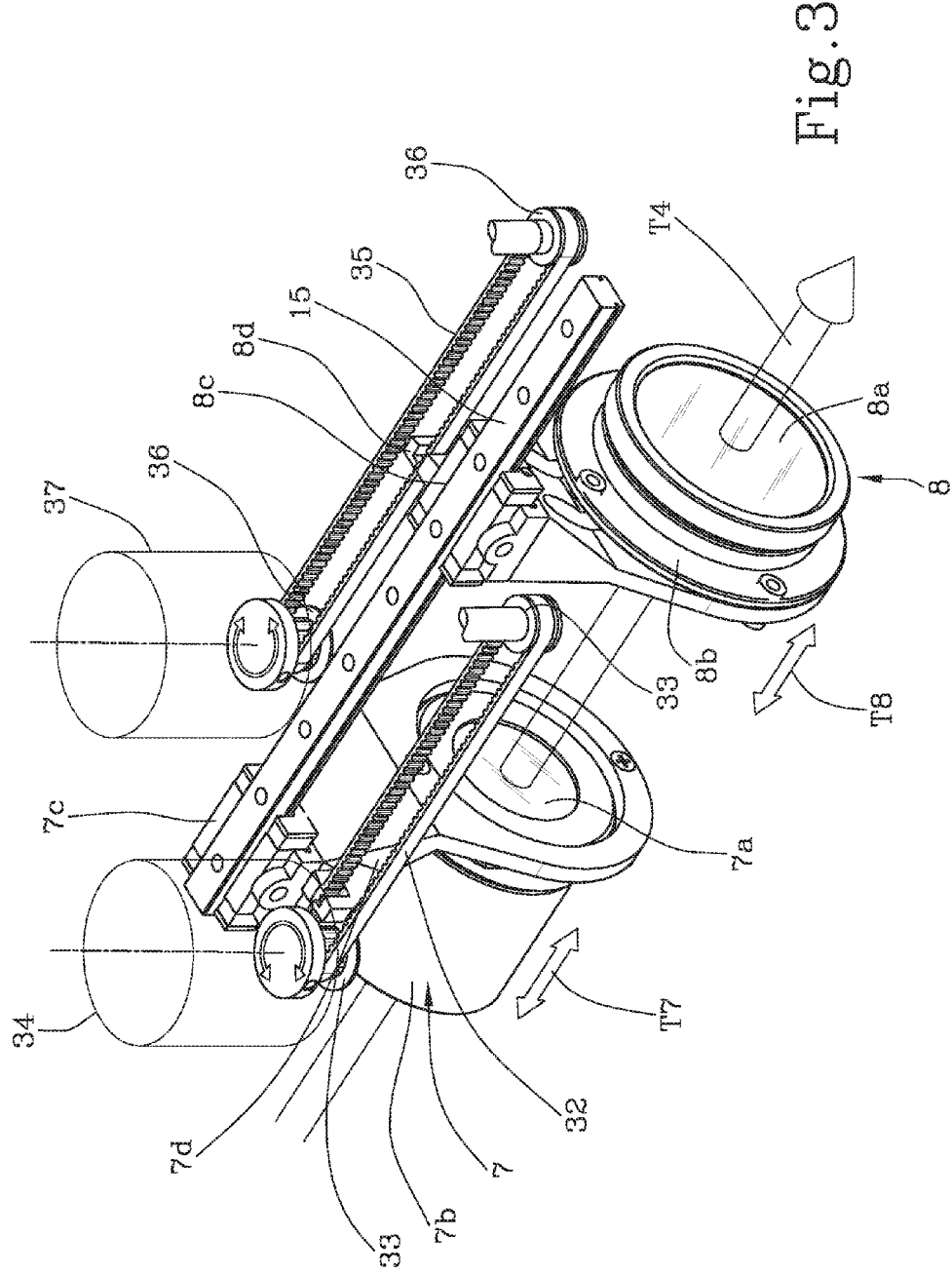
FIG. 3 is a perspective view, with some parts cut away, of a detail of the projector of FIGS. 1 and 2 showing a first and a second optical body forming part of the projector.

The projector 1 also comprises a second optical body 8 for varying the focal length of the light beam, interposed between the first optical body 7 and the outlet lens 6 and connected internally to the frame 3 (see also FIG. 3).

It should be noted that the second optical body is configured to move, in two directions, along the frame for modifying its position relative to the outlet lens 6 and to the first optical body 7 along a trajectory T8 parallel to the axis X2 of the shell 2 (see also FIG. 3).

The projector 1 also comprises at least a third optical body 9 that generates an optical effect acting on the beam of light and is positioned inside the frame 3.

In light of this, the third optical body 9 has means for supporting a lens 11 for optical effect configured to move, between a non-operating position, wherein the third optical body 9 is moved away from the light beam, and an operating position, wherein the third optical body 9 is positioned along the trajectory T4 of illumination of the light beam.

According to the invention, the projector 1 of light beams has a carriage 12 for supporting the at least third optical body 9 connected to a wall of the frame 3.

Also according to the invention, the projector 1 comprises movement means 13 positioned on the frame 3 and connected to the carriage 12 for moving, in both directions, the at least third optical body 9 along a trajectory T9 parallel to the axis X2 of the shell 2 in such a way as to modify its position relative to the first 7 and to the second 8 optical body.

In other words, the third optical body 9 is independent as regards its adjustment of position relative to the first and second optical body 7 and 8. Preferably, the above-mentioned support means of the lens 11 comprise an arm 10 supporting the lens 11 for optical effect configured to rotate, between a non-operating position, wherein the third optical body 9 is moved away from the light beam, and an operating position, wherein the third optical body 9 is positioned along the trajectory T4 of illumination of the light beam.

The arm 10 is articulated to the carriage 12 (at a relative end).

Figure 6:
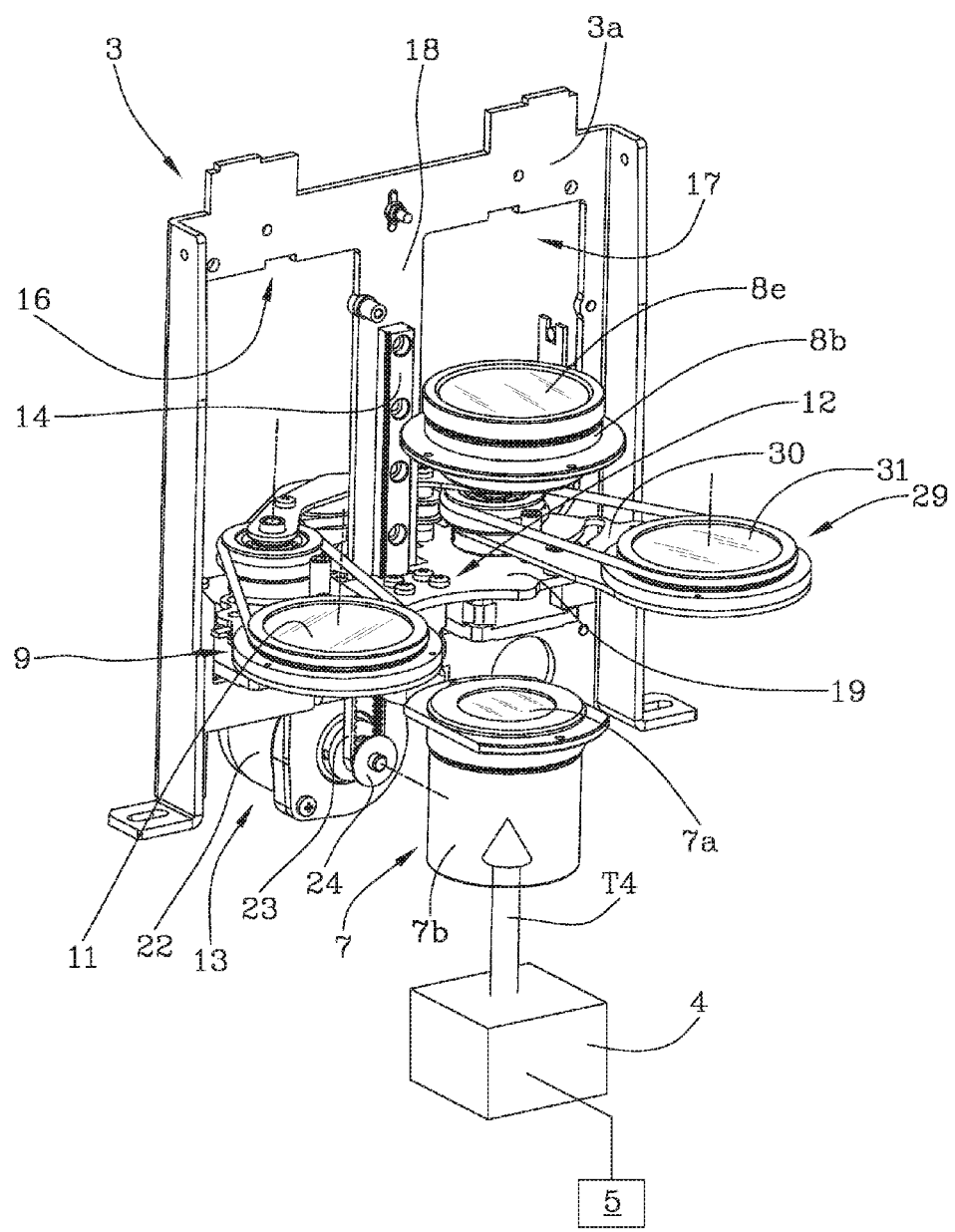
FIG. 6 is a perspective view of a portion of the projector of FIGS. 1 and 2 which schematically shows the four optical units in which the third and fourth optical units are in a non-operating configuration for its adjustment.
Figure 8:
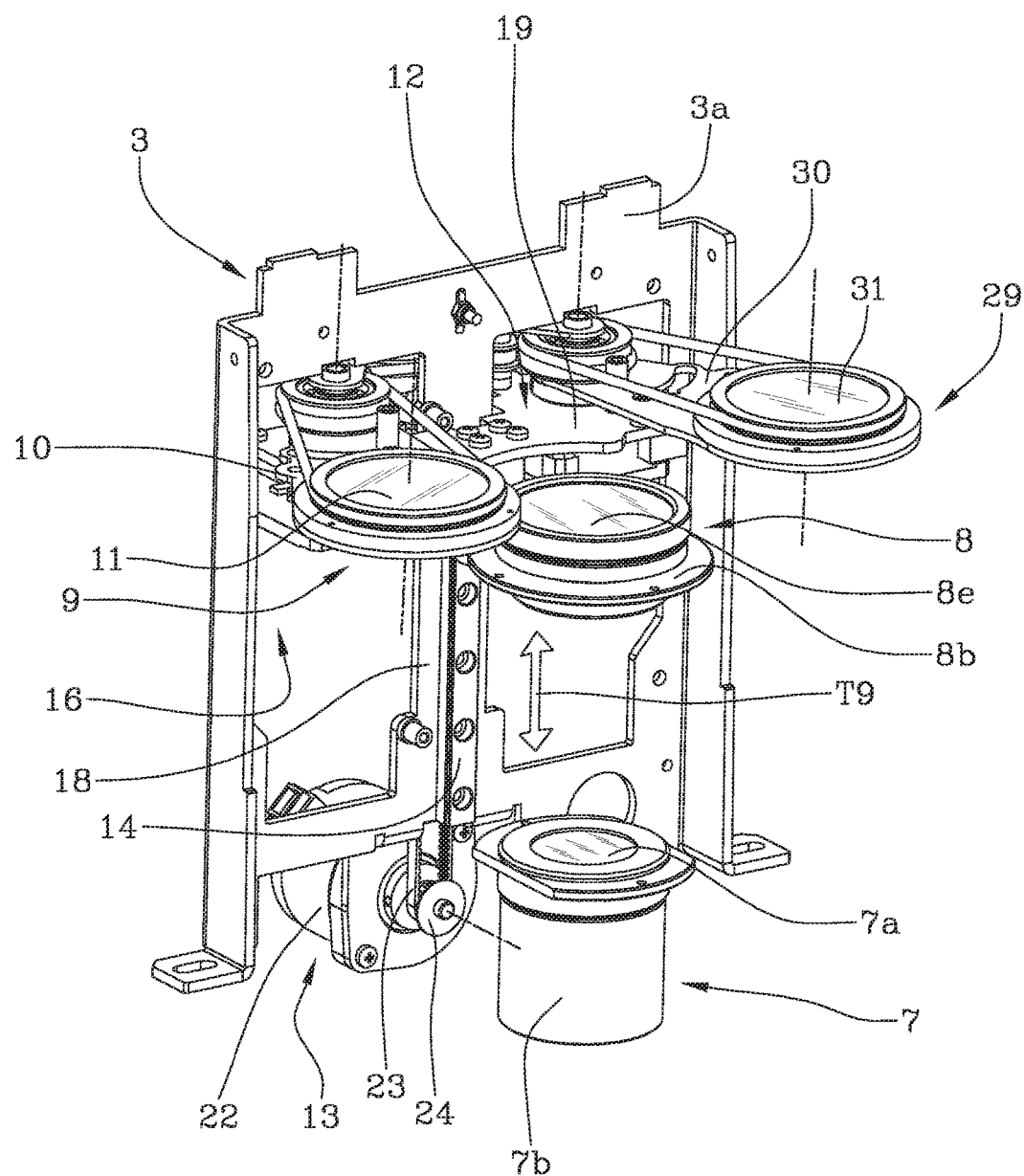
FIG. 8 is a perspective view of the portion of the projector of FIGS. 6 and 7 in which the third and fourth optical units are in a further non-operating configuration for its adjustment in a position different.
Figure 9:
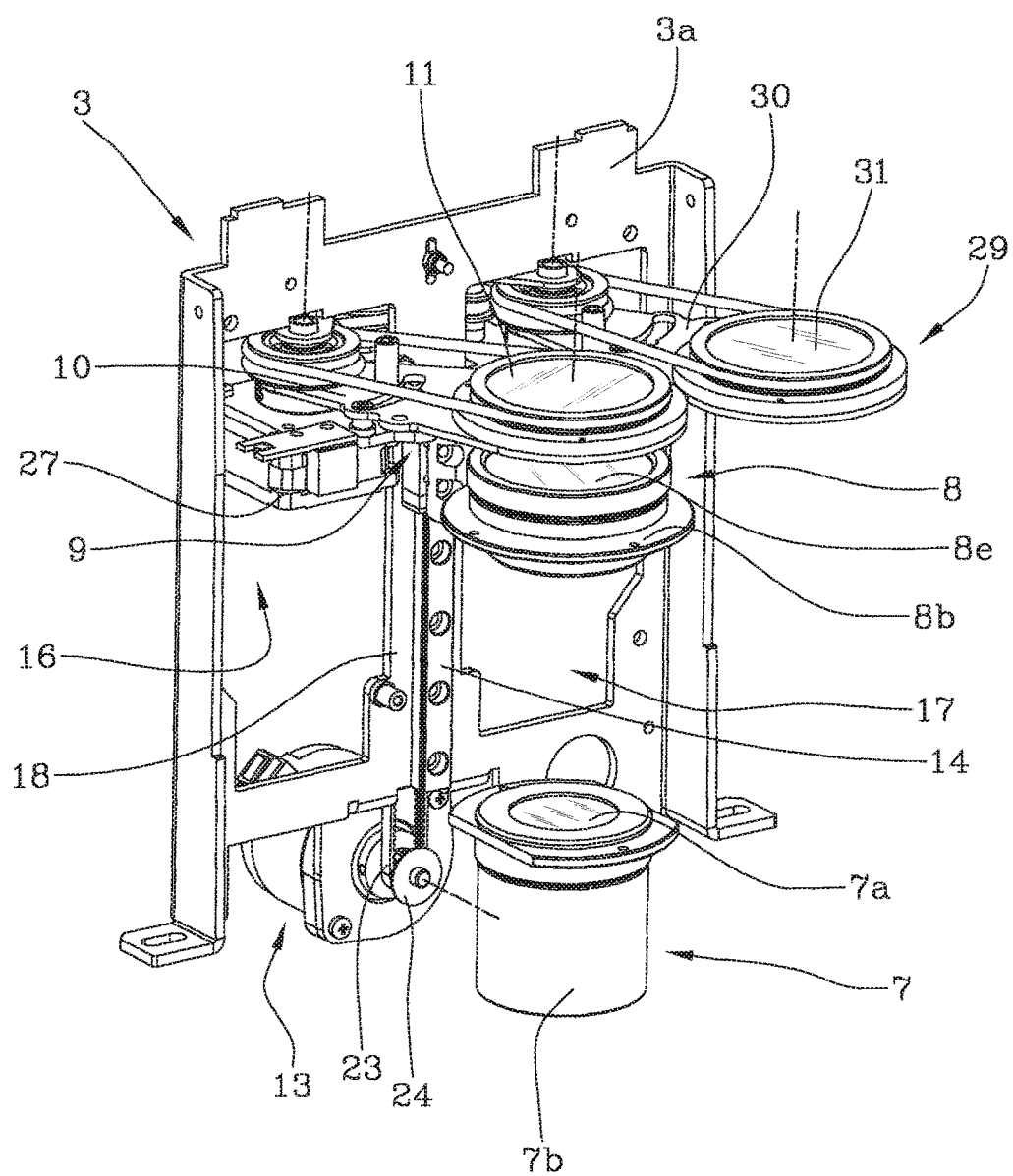
FIG. 9 is a perspective view of the portion of the projector of FIGS. 6 to 8 in which one between the third and fourth optical units is in a second operating configuration relative to the adjustment position shown in FIG. 8.

The increase in adjustment features of the third optical body 9, that is, the combination of two different types of movements (rotating for example with the arm 10 and slidable) makes it possible to modify the position of the third optical body 9 in several operating positions, that is, interpose between the first and the second optical body 7 and 8 (FIG. 6), or between the second optical body 8 and the outlet lens 6 (FIG. 8) and, if necessary, also between the light source 4 and the first optical body 7 (not illustrated).

In addition to this, it is possible, by combining the movements of the third optical body 9 with the movement for adjustment of the first and second optical body 7 and 8, to vary the reciprocal distances (the center distances) between the three bodies to increase the optical effects of the projector 1.

This independence of movement of the third optical body considerably increases the operational features of the projector.

Preferably, the surface of the frame 3 on which the carriage 12 is supported has a linear guide 14 on which the carriage 12 for supporting the third optical body 9 is slidably coupled.

Preferably, the carriage 12 is connected to a first wall 3a of the frame 3 separate from a second wall 3b of the frame 3 to which the first 7 and the second 8 optical body are connected.

It should be noted that the frame 3 comprises a plurality of walls connected to each other to make up and delimit a central body with a predetermined volume in which the three optical bodies 7, 8 and 9 move.

Preferably, the first wall 3a for connecting the carriage 12 is positioned facing the second wall (3b) for connecting the first and second optical bodies 7 and 8.

Preferably, the linear guide 14 for the sliding of the carriage 12 protrudes towards the inside of the frame 3 and faces a further linear guide 15 for sliding and guiding for the first 7 and the second 8 optical body.

In light of this (see FIG. 3), the second wall 3b of the frame 3 comprises the further linear guide 15 to which the first and the second optical body 7 and 8 are connected.

It should be noted that the term optical body means a combination of at least one lens and a frame for protecting and supporting the lens.

The first optical body 7 comprises a lens (which can be adjusted) 7a and a supporting body 7b equipped with means 7c for connection to the linear guide 15.

The connection means 7c also comprises an arm 7d connected to a belt 32 closed in the form of a loop on a pair of pulleys 33 of which one is connected to a drive unit 34 for the movement of the first optical body 7.

The belt 32 is positioned laterally to the linear guide 15, whilst the pulleys 33 and the drive unit 34 are supported by the second wall 3b.

The second optical body 8, in turn, comprises a lens (which can be adjusted) 8a and a supporting body 8b equipped with means 8c for connection to the linear guide 15.

The connection means 8c also comprises an arm 8d connected to a further belt 35 closed in the form of a loop on a pair of pulleys 36 of which one is connected to a drive unit 37 for the movement of the second optical body 8.

The belt 35 is positioned laterally to the linear guide 15 (on the opposite side of the guide 15 relative to the position of the belt 32 of the first optical body 7), whilst the pulleys 36 and the drive unit 34 are supported by the second wall 3b.

Preferably, the first wall 3a of the frame 3 to which the carriage 12 is connected has two openings 16 and 17 separated by a central column 18 on which the sliding guide 14 of the carriage 12 is positioned.

Figure 4:
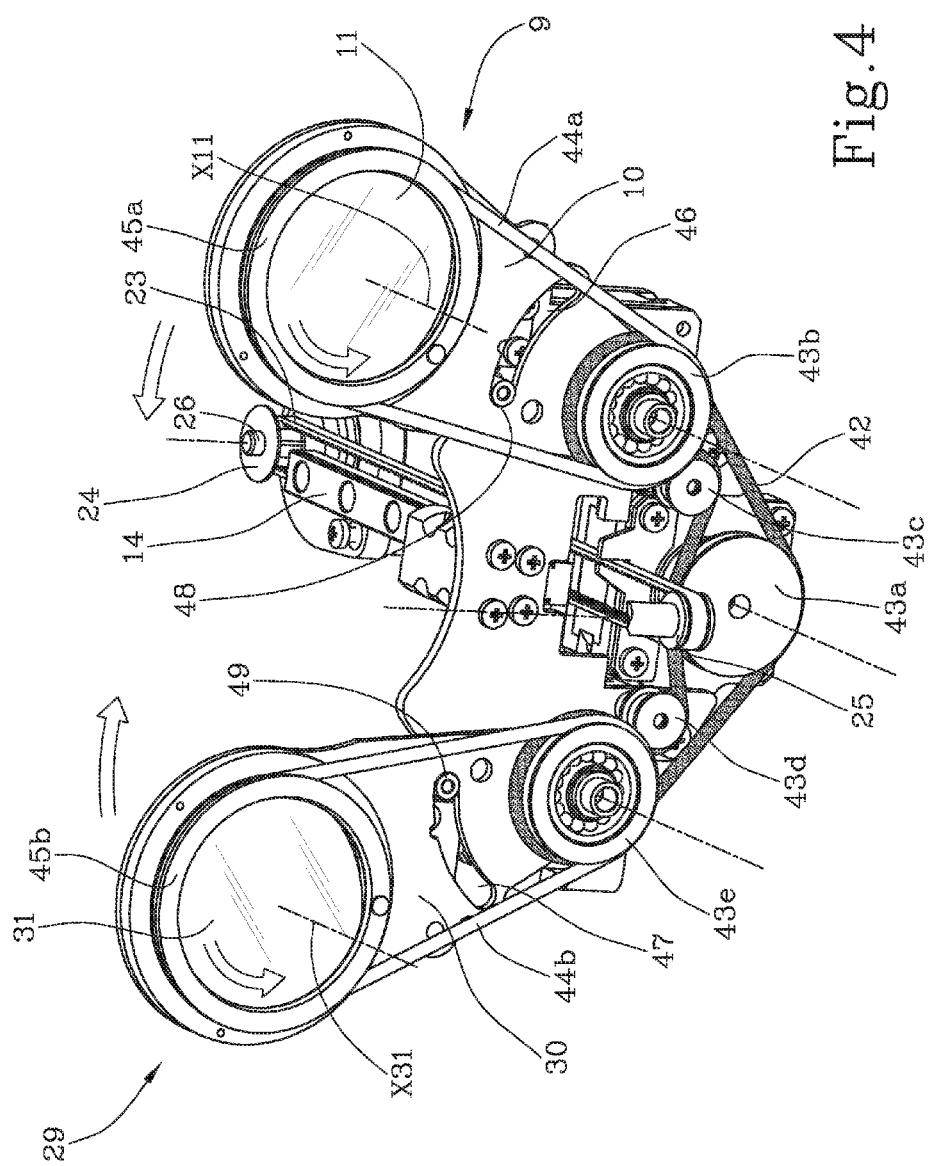
FIG. 4 is a rear perspective view of a further detail of the projector of FIGS. 1 and 2 showing a third and a fourth independent optical body forming part of the projector.
Figure 5:
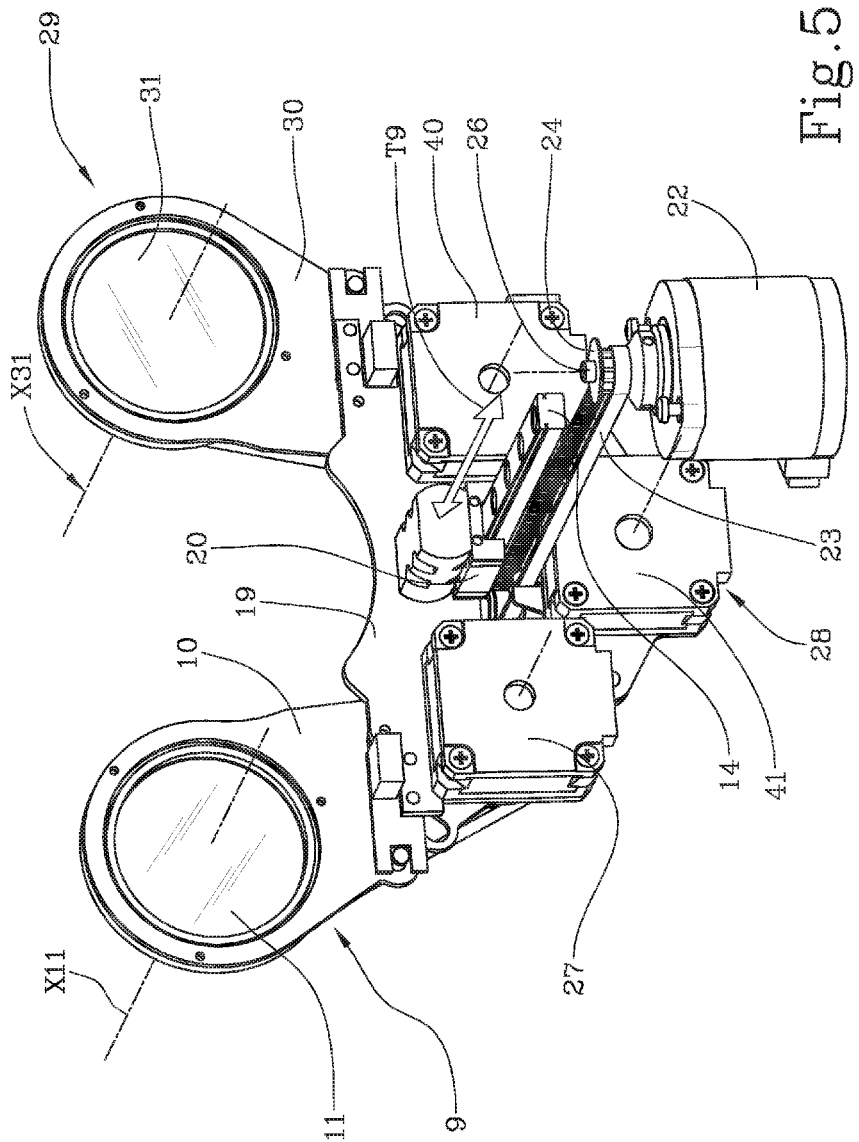
FIG. 5 is a front perspective view of the detail of the third and fourth independent optical body of FIG. 4.

The carriage 12 comprises a plate 19 equipped at the front with a slide 20 for coupling with the guide 14. The plate 19 is configured to enclose the central column 18 of the frame 3 (see FIGS. 4 and 5).

In light of this, the carriage 12 comprises a closing body 21 associated with the plate 19 and positioned on the rear side (outer) of the first wall 3a for connection to the carriage 12 (see FIG. 1).

Between the plate 19 and the closing body 21 one end of the arm 10 is articulated for supporting the lens 11 protruding from one of the openings 16 and 17 of the first wall 3a of the frame 3 in such a way as to position the third optical body 9 laterally to the sliding guide 14, in its non-operating position, and with the possibility of rotating along a horizontal plane perpendicular to the trajectory T4 of illumination.

Preferably, the movement means 13 comprise a drive unit 22) associated with the frame 3 and positioned on the rear side of the first wall 3a of the frame 3.

The movement means 13 also comprise a belt 23 closed in the form of a loop on a pair of pulleys 24 and 25, of which one connected to a shaft 26 of the drive unit 22.

The belt 23 is connected to the plate 19 for moving the plate 19 along the frame 3 in two directions.

Preferably, the plate 19 is associated with a first drive unit 27 for operating the arm 10 supporting the lens 11 for rotation of the arm 10.

Means 28 for rotating the lens 11 about its axis X11 are also associated on the movement body 21.

Preferably, see in particular FIGS. 4 to 9, the projector 1 also comprises a fourth optical body 29 that generates a optical effect acting on the beam of light.

Figure 7:
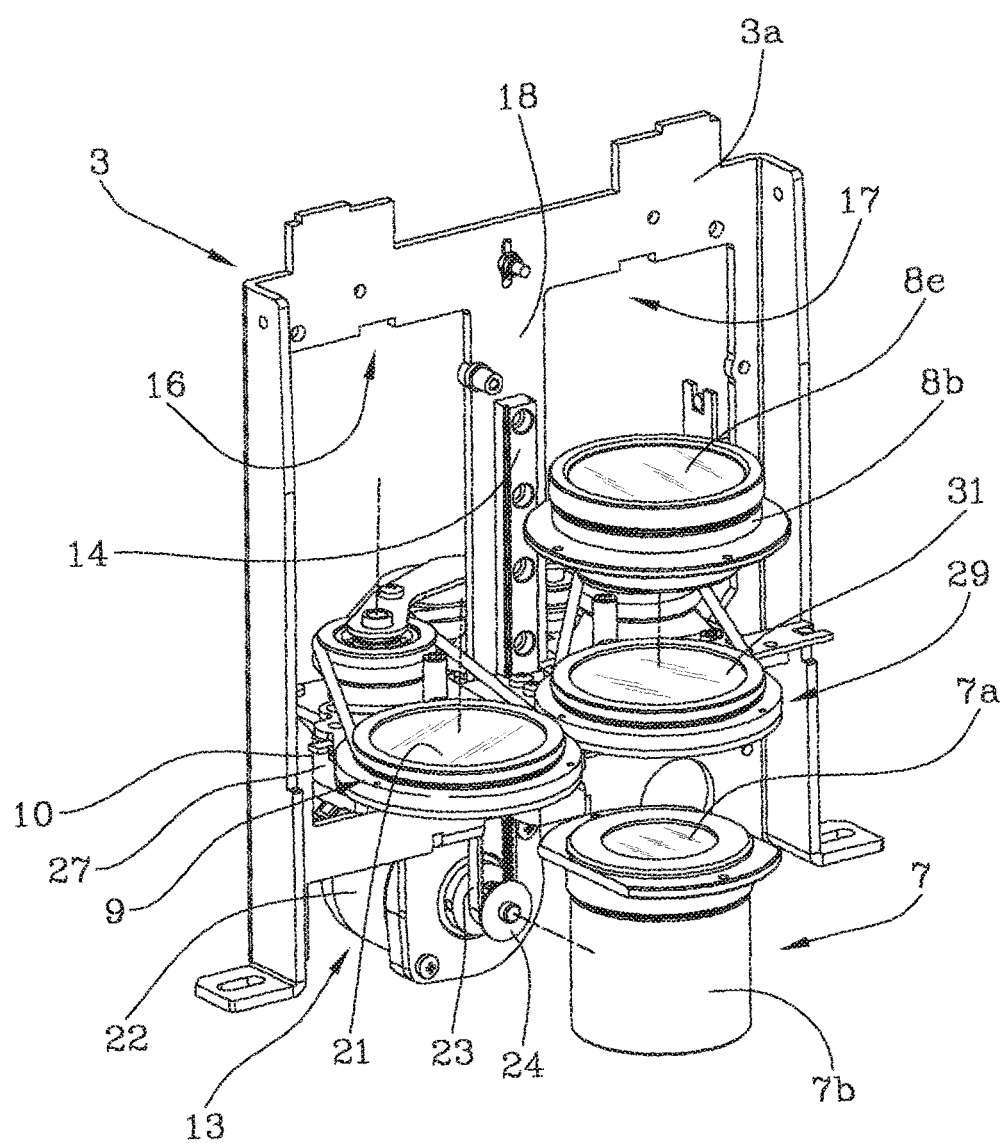
FIG. 7 is a perspective view of the portion of the projector of FIG. 6 in which one between the third and fourth optical units is in a first operating configuration.

In light of this, the fourth optical body 29 has a corresponding arm 30 articulated to the carriage 12 in a separate position relative to the arm 10 of the third optical body 9 and movable in rotation, selectively in an alternating fashion with the third optical body 9, between a non-operating position, wherein the fourth optical body 29 is moved away from the light beam (see FIGS. 4 to 6 and 8 to 9), and an operating position, wherein the fourth optical body 29 is positioned along the trajectory T4 of illumination of the light beam (see FIG. 7).

The supporting arm 29 supports a corresponding lens 31 for optical effects.

More specifically, an end of the further arm 30 is articulated on the plate 19 for supporting the lens 31 protruding from the other opening 17 or 16 of the first wall 3a of the frame 3 in such a way as to position the fourth optical body 29 laterally to the sliding guide 14, in its non-operating position, and with the possibility of rotating along a horizontal plane perpendicular to the trajectory T4 of illumination. This horizontal plane of rotation is in common for the third and fourth optical body 9 and 29 and, for this reason, the operating position alternates between the two optical bodies 9 and 19.

For this reason, a further drive unit 40 for rotation of the arm 30 is positioned on the plate 19, coordinated with the drive unit 27 for rotation of the arm 10 of the third optical body 9.

The above-mentioned means 28 for rotation of the lens 11 about its axis X11 are configured to simultaneously rotate also the lens 31 of the fourth optical body 29 about its axis X31.

In other words, each third and fourth optical body 9 and 29 comprises an arm 10-30 articulated at a relative end to the plate 19 by means of a supporting shaft connected to the respective drive unit 27-40 for its rotation.

The means 28 for rotating the lenses 11 and 31 comprise a further drive unit 41 positioned in the center of the operating body 21 and between the two previous drive units 27 and 40.

The drive unit is connected to a belt 42 closed in the form of a loop along a path passing through different pulleys 43a-43e.

Two of these pulleys 43b and 43e are connected (by means of further belts 44a and 44b) to the corresponding rotating frames 45a and 45b integral with the lenses 11, 31 in such a way as to obtain the simultaneous rotation of the two lenses 11 and 31 (in the same direction) through a single drive unit.

It should be noted, moreover, that each arm 10 and 30 has a corresponding slot 46 and 47 engaged by a corresponding pin 48, 49 protruding from the plate 19 to define an end of stroke system between the non-operating and operating positions of each arm 10 and 30.

The preset aims are achieved thanks to a projector structured in this way.

The specific features of the projector increase considerably compared with traditional solutions thanks to the independent movement of the third and fourth optical body.

The overall size of the projector remains unchanged thanks to the particular configuration of the carriage and the means for moving the third optical unit.

What is claimed is:

1. A projector of light beams comprising:
    a shell having a first end and a second end joined by a central frame to define an axis of extension of the shell;
    a light source located at the first end of the shell and connected to a source of energy for emitting a light beam along a lighting trajectory parallel to the axis of extension of the shell;
    an outlet lens of the light beam positioned at the second end of the shell;
    a first optical body for focusing the light beam, interposed between the light source and the outlet lens, and connected internally to the frame; the first optical body being configured to move in both directions along the frame in such a way as to modify its distance from the light source along a trajectory parallel to the axis of the shell;
    a second optical body for varying the focal length of the light beam, interposed between the first optical body and the outlet lens and connected internally to the frame; the second optical body being configured to move in both directions along the frame for modifying its position relative to the outlet lens and to the first optical body along a trajectory parallel to the axis of the shell;
    at least a third optical body generating an optical effect acting on the beam of light and positioned inside the frame; the third optical body having means for supporting a lens for optical effect configured for moving, between a non-operating position, wherein the third optical body is moved away from the light beam, and an operating position, wherein the third optical body is positioned along the trajectory of illumination of the light beam;
    a carriage for supporting the third optical body connected to a wall of the frame; and
    movement means positioned on the frame and connected to the carriage for moving, in both directions, the at least third optical body along a trajectory parallel to the axis of the shell in such a way as to modify its position relative to the first and to the second optical body; and
    wherein the frame comprises a first wall for connecting to the carriage having two openings separated by a central column on which is positioned a guide for sliding of the carriage; the carriage comprising a plate equipped with a slide for coupling with the guide and configured to enclose the central column of the frame; and
    wherein on the plate there are associated a first drive motor for operating the arm supporting a lens for the rotation of the arm and means of rotating the lens about its axis.

2. The projector according to claim 1, wherein the at least third optical body comprises an arm articulated to the carriage and defining the support means of the lens; the arm being configured to rotate, between a non-operating position, wherein the third optical body is moved away from the light beam, and an operating position, wherein the third optical body is positioned along the trajectory of illumination of the light beam.

3. The projector according to claim 2, comprising a fourth optical body generating an optical effect acting on the light beam; the fourth optical body having a corresponding arm articulated to the carriage in a separate position relative to the arm of the third optical body and movable in rotation, selectively in an alternating fashion with the third optical body, between a non-operating position, wherein the fourth optical body is moved away from the light beam, and an operating position, wherein the fourth optical body is positioned along the trajectory of illumination of the light beam.

4. The projector according to claim 1, wherein the wall of the frame has a linear guide on which the carriage for supporting the third optical body is slidably coupled.

5. The projector according to claim 4, wherein the linear guide for the sliding of the carriage protrudes towards the inside of the frame and faces a further linear guide for sliding and guiding for the first and the second optical body.

6. The projector according to claim 1, wherein the carriage is connected to a first wall of the frame separate from a second wall of the frame to which the first and the second optical body are connected.

7. The projector according to claim 6, wherein the first wall for connecting the carriage is positioned facing the second wall for connecting the first and second optical body.

8. The projector according to claim 1, wherein the carriage comprises a closing body associated with the plate and positioned at the rear side of the first wall for connecting to the carriage; between the plate and the closing body one end of an arm is articulated for supporting a lens protruding from one of the openings of the first wall of the frame in such a way as to position the third optical body laterally to the sliding guide, in its non-operating position, and with the possibility of rotating along a horizontal plane perpendicular to the trajectory of illumination.

9. The projector according to claim 1, wherein the means of movement comprise a drive unit associated with the frame and positioned on the rear side of the first wall of the frame, and a belt trained around a pair of pulleys, of which one connected to a shaft of the drive unit; the belt being connected to the plate for moving in both directions the same plate for operating along the frame.

10. A projector of light beams comprising:
- a shell having a first end and a second end joined by a central frame to define an axis of extension of the shell;
- a light source located at the first end of the shell and connected to a source of energy for emitting a light beam along a lighting trajectory parallel to the axis of extension of the shell;
- an outlet lens of the light beam positioned at the second end of the shell;
- a first optical body for focusing the light beam, interposed between the light source and the outlet lens, and connected internally to the frame; the first optical body being configured to move in both directions along the frame in such a way as to modify its distance from the light source along a trajectory parallel to the axis of the shell;
- a second optical body for varying the focal length of the light beam, interposed between the first optical body and the outlet lens and connected internally to the frame; the second optical body being configured to move in both directions along the frame for modifying its position relative to the outlet lens and to the first optical body along a trajectory parallel to the axis of the shell;
- at least a third optical body generating an optical effect acting on the beam of light and positioned inside the frame; the third optical body having means for supporting a lens for optical effect configured for moving, between a non-operating position, wherein the third optical body is moved away from the light beam, and an operating position, wherein the third optical body is positioned along the trajectory of illumination of the light beam;
- a carriage for supporting the third optical body connected to a wall of the frame;
- movement means positioned on the frame and connected to the carriage for moving, in both directions, the at least third optical body along a trajectory parallel to the axis of the shell in such a way as to modify its position relative to the first and to the second optical body; wherein the at least third optical body comprises an arm articulated to the carriage and defining the support means of the lens; the arm being configured to rotate, between a non-operating position, wherein the third optical body is moved away from the light beam, and an operating position, wherein the third optical body is positioned along the trajectory of illumination of the light beam; and
- a fourth optical body generating an optical effect acting on the light beam; the fourth optical body having a corresponding arm articulated to the carriage in a separate position relative to the arm of the third optical body and movable in rotation, selectively in an alternating fashion with the third optical body, between a non-operating position, wherein the fourth optical body is moved away from the light beam, and an operating position, wherein the fourth optical body is positioned along the trajectory of illumination of the light beam.

\* \* \* \* \*